United States Patent [19]

McKinney

[11] Patent Number: 5,211,520

[45] Date of Patent: May 18, 1993

[54] SELF-THREADING FASTENER

[76] Inventor: Blake McKinney, 306 Washington St., Marietta, Ohio 45750

[21] Appl. No.: 907,822

[22] Filed: Jul. 2, 1992

[51] Int. Cl.$^5$ .................. F16B 35/04; F16B 39/34
[52] U.S. Cl. .................. 411/418; 411/386; 411/304
[58] Field of Search ............ 411/386, 387, 418, 420, 411/421, 422, 304

[56] References Cited

U.S. PATENT DOCUMENTS

| 429,851 | 6/1890 | Ericson. | |
|---|---|---|---|
| 2,096,937 | 10/1937 | McManus. | |
| 2,428,783 | 10/1947 | Cole | 411/418 X |
| 2,631,812 | 3/1953 | Mueller et al.. | |
| 2,738,698 | 3/1956 | Poupitch. | |
| 2,823,574 | 2/1958 | Rosan. | |
| 3,149,654 | 9/1964 | Podell | 411/304 |
| 3,492,908 | 2/1970 | Thurston. | |
| 4,449,874 | 3/1984 | McKinney. | |
| 5,000,639 | 3/1991 | Hinkley et al.. | |

FOREIGN PATENT DOCUMENTS 23259  2/1981  European Pat. Off. ............ 411/422

Primary Examiner—Neill R. Wilson
Attorney, Agent, or Firm—Frost & Jacobs

[57] ABSTRACT

A threaded fastener in the form of a bolt or screw for recutting damaged threads during installation in a previously threaded bore or for cutting threads in a non-threaded bore. The fastener comprises a threaded shank terminating in a headed end and in a non-threaded frustro-conical lead-in end. A cavity is formed in the shank extending longitudinally from the first shank thread adjacent the frustro-conical lead-in shank end toward the headed shank end. The cavity comprises a slot of obround peripheral configuration having a planar bottom and a depth greater than the depth of the shank threads. At the end of the slot, nearest the lead-in end of the fastener, a radial bore is provided in the shank having a depth up to the longitudinal axis of the fastener shaft and a diameter equal to the diameter of the curved end of the obround slot. The trailing longitudinal edge of the slot comprises a thread cutting edge. The cavity comprises a collecting, retaining, and compacting recess for metal cuttings, from which the cuttings cannot escape.

6 Claims, 1 Drawing Sheet

SELF-THREADING FASTENER

TECHNICAL FIELD

The invention relates to a threaded fastener capable of recutting damaged threads in a bore, and more particularly to such a fastener which has a threaded shank with a lead-in end, a headed end, and a longitudinal cavity located between these ends, the cavity providing a cutting edge and a recess for collecting, retaining and compacting metal cuttings.

BACKGROUND ART

While the threaded fastener of the present invention, in the form of a bolt or screw, is capable of cutting new threads in an appropriately sized unthreaded bore, it is particularly adapted to recut threads in a previously threaded bore wherein the threads have been damaged or stripped. For purposes of an exemplary showing, the fastener of the present invention will be described in terms of this application thereof.

Prior art workers have devised a number of bolt-like fasteners for this vary purpose. U.S. Pat. Nos. 2,096,937; 2,738,698; 1,823,574; 3,492,908; 4,449,874 and 5,000,639 are exemplary.

All of the above-listed references, with the exception of U.S. Pat. No. 4,449,874, provide one or more cutting edges at the lead-in end of the fastener. The cutting edges are formed by grooves which extend through the lead-in end of the fastener and conduct metal cuttings into the bore being rethreaded. The above-noted patent 4,449,874 differs in that it is provided with a longitudinal slot which is spaced from the lead-in end of the fastener. That end of the slot nearest the lead-in end of the fastener is provided with a first hole which extends transversely through the fastener. This transverse hole is intersected by a second axial hole which extends from the transverse hole through the lead-in end of the fastener. As a consequence, the two holes serve to form a passage directing metal cuttings into the bore being rethreaded. Thus, even though the cutting edge, formed by the longitudinal slot, is spaced from lead-in end of the fastener, the first and second holes still provide a passage for metal cuttings to enter the bore.

The present invention is based upon the discovery that a number of advantages can be realized if the metal cuttings are collected, retained and compacted within a slot in the fastener. To this end, the fastener of the present invention comprises a threaded shank terminating in a lead-in end and a headed end. The shank is provided with a longitudinally extending slot slightly deeper than the threads and extending from the first thread adjacent the lead-in end toward the headed end. That end of the slot nearest the lead-in end of the fastener includes a transverse bore which extends radially inwardly of the shank toward, but not beyond the shank longitudinal axis.

As the fastener of the present invention is turned into the bore to be rethreaded, the trailing longitudinal edge of the slot constitutes a cutting surface and metal cuttings formed as a result of the thread cutting operation are collected, retained and compacted in the slot and its axial bore.

As a consequence of this structure, the fastener of the present invention captures all of the metal cuttings and prevents them from entering the bore. This eliminates damage to the threads caused by the cuttings. It further eliminates the possibility of the cuttings causing binding and increasing the torque requirement to the extent that the fastener, itself, could break. The faster of the present invention is characterized by increased strength, as compared to a fastener of the type taught in U.S. Pat. No. 4,449,874, since it does not have an axial hole, or a transverse hole which extends through the entire fastener. It has further been found that containment and compacting of he metal cuttings will have a locking effect on the fastener when fully seated in the bore, resisting loosening of the fastener by virtue of vibration and the like.

DISCLOSURE OF THE INVENTION

According to the invention there is provided a threaded fastener in the form of a bolt or screw, capable of recutting damaged threads during its installation into a previously threaded bore.

The fastener comprises a threaded shank of uniform diameter, terminating in a headed end and in a non-threaded frustro-conical lead-in end.

A cavity is formed in the thank of the fastener extending longitudinally thereof from the first thread adjacent the frustro-conical lead-in end toward the headed end. The cagily comprises a slot of obround peripheral configuration. The slot has a planar bottom and a depth slightly greater than the depth of the screw threads. At the end of the slot, nearest the lead-in end of the fastener, a transverse bore is provided in the shank. The bore extends radially of the fastener and has a depth greater than the depth of the slot up to, but not beyond, the long axis of the fastener shaft. The diameter of the bore is equal to the diameter of the rounded end of the obround slot. The trailing longitudinal edge of the obround slot comprises a thread cutting edge. The cavity, including the slot and bore, comprises a collecting, retaining and competing recess for metal cuttings created by the thread recutting operation, and from which the cuttings cannot escape.

DETAILED DESCRIPTION OF THE INVENTION

Figure 1:
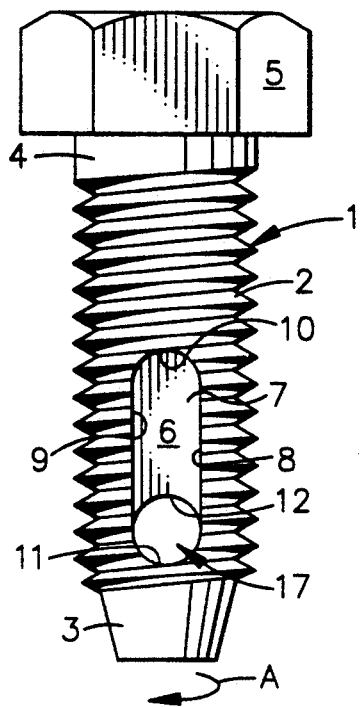
FIG. 1 is an elevational view of the fastener of the present invention.
Figure 2:
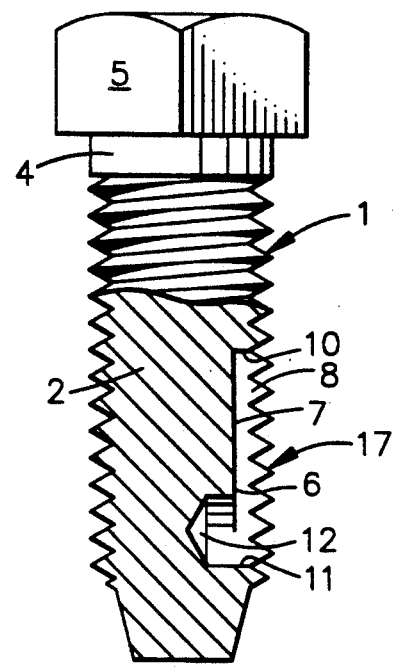
FIG. 2 is an elevational view, partly in cross section, of the fastener of FIG. 1, as seen from the left of that Figure.

In all of the Figures, like parts have been given like index numerals. Referring first to FIGS. 1 and 2, the bolt or screw of the present invention is generally indicated at 1 and comprises an elongated threaded shank 2 of uniform diameter. The threaded shank 2 terminates at one end in a frustro-conical lead-in 3. The lead-in end 3 tapers inwardly and serves as a guide to properly align the bolt 1 for entry into the bore it is to rethread. At its other end, the threaded shank terminates in a short unthreaded portion 4 leading to a head 5. The head 5 is illustrated as having a conventional hexagonal peripheral configuration, as is well known in the art.

The shank 2 is provided with an elongated slot 6. The slot 6 has a planar bottom 7 and an abround peripheral configuration with parallel rectilinear sides 8 and 9 and semicircular ends 10 and 11. At the semicircular end 11, the shank 2 is provided with a radial bore 12 having the same diameter as the semicircular slot end 11. The radial bore 12 may have any appropriate depth up to, but not beyond, the longitudinal axis of shank 2. In other words, the radial bore may have a length up to, but not greater than, one-half the diameter of shank 2.

Figure 3:
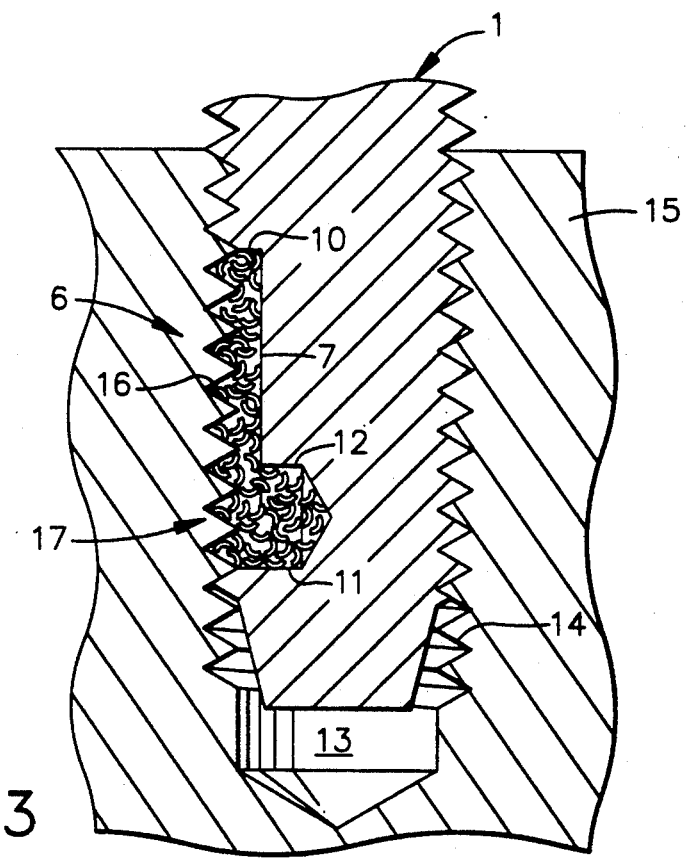
FIG. 3 is a fragmentary cross sectional view illustrating the fastener of the present invention having rethreaded a bore the threads of which had previously been damaged or stripped.

It will be apparent from the Figures that the fastener or bolt 1, when used to rethread a bore, such as bore 13 of FIG. 3, will be driven by a clockwise rotation, as indicated by arrow A in FIG. 1. As a consequence of this clockwise rotation, the rectilinear, longitudinal edge 9 of slot 6 may be considered the leading edge and the rectilinear, longitudinal slot edge 8 may be considered the trailing edge. The trailing edge 8, illustrated in FIG. 2, constitutes the thread cutting edge. As the edge 8 recuts the threads 14 of bore 13 in member 15, metal cuttings 16 will be formed. The slot 6 and bore 12 form a cavity generally indicated at 17. As is apparent from FIG. 3, when the bolt 1 is driven far enough into the bore 13, the bore 13, itself, closes cavity 17 and the cuttings 16 are collected, retained and compacted therein.

It will be appreciated that the bore 13 was originally drilled and threaded for a bolt of predetermined size and thread pitch. The bolt 1 of the present invention will be selected as having the same thread pitch, but the threads of shank 2 will be slightly deeper so as to tap new threads in bore 13 so that the slightly oversized bolt of the present invention will have a holding lower at least equivalent to the bolt it replaces. It will be understood that the bolt 1 can be made in a number of sizes and provided with threads of appropriate pitch. If the bolt 1 is to be used with a new, unthreaded bore, bolt 1 may be made in standard sizes, or the bore may be sized to accommodate the bolt.

It has been found that the obround peripheral configuration of slot 6 will tend to cause a circulation of the metal cuttings 16, generally leading to the radial bore 12. In a preferred embodiment, the overall cavity 17 (comprising slot 6 and radial bore 12), is so sized that, when the bolt is driven home, the cuttings collected and retained in cavity 17 are somewhat compressed and react with the adjacent bore threads in such a way as to have a locking action on the bolt tending to maintain the bolt tightly in place and substantially precluding loosening of the bolt due to vibration, or the like.

As is well known in the art, the bolt 1 may be made of hardenable steel. The bolt is fabricated with the steel in its soft state and thereafter is heat treated. The exterior of the bolt should have a Rockwell hardness of from about 48 to about 55 to a depth of from about 0.008 to about 0.012 inch. The core of the bolt may have a Rockwell hardness of from about 32 to about 39.

Modifications may be made in the invention without departing from the spirit of it.

What is claimed:

1. A fastener for recutting damaged or stripped metal threads of a previously threaded bore, said fastener comprising a threaded shank, said shank threads having the same pitch and being slightly deeper than said damaged bore threads, said shank terminating at one end in a head portion and at its other end in a frustro-conical lead-in portion, said shank having an elongated cavity formed therein and extending from the first of said shank threads adjacent said lead-in portion toward said head portion, said cavity having an edge portion comprising a thread cutting edge, said cavity being so configured as to comprise a collecting, retaining and compacting recess for metal cuttings formed by said cutting edge and from which said cuttings cannot escape.

2. The fastener claimed in claim 1 wherein said cavity comprises an elongated slot having an aground peripheral configuration with parallel rectilinear sides extending longitudinally of said shank and semicircular ends, said slot having a depth greater than said threads, said shank having a radial bore formed therein at said end of said slot nearest said lead-in portion of said fastener, said radial bore having a diameter equal to the diameter of said adjacent semicircular slot end and a depth up to the long axis of said fastener shank.

3. The fastener claimed in claim 1 wherein said cavity is so dimensioned that when said fastener is fully seated in said bore said cuttings will be compressed and will cooperate with said bore to lock said fastener in place against the effect of vibration and the like.

4. The fastener claimed in claim 1 wherein said fastener has an exterior Rockwell hardness of from about 48 to about 55 to a depth of from about 0.008 to about 0.012 inch, the remainder of said fastener having a Rockwell hardness of from about 32 to about 39.

5. The fastener claimed in claim 2 wherein said cavity is so dimensioned that when said fastener is fully seated in said bore said chips will be compressed and will cooperate with said bore to lock said fastener in place against the effect of vibration and the like.

6. The fastener claimed in claim 5 wherein said fastener has an exterior Rockwell hardness of from about 48 to about 55 to a depth of from about 0.008 to about 0.012 inch, the remainder of said fastener having a Rockwell hardness of from about 32 to about 39.

* * * * *